E. J. TIMERMAN.
LUBRICATOR.
APPLICATION FILED SEPT. 19, 1919.

1,364,464.

Patented Jan. 4, 1921.

WITNESSES
A. P. Appleman
P. H. Pattison

INVENTOR
E. J. TIMERMAN,
BY Munn & Co.
ATTORNEYS

ID.

UNITED STATES PATENT OFFICE.

EUGENE JOSEPH TIMERMAN, OF SYRACUSE, NEW YORK.

LUBRICATOR.

1,364,464. Specification of Letters Patent. Patented Jan. 4, 1921.

Application filed September 19, 1919. Serial No. 324,749.

*To all whom it may concern:*

Be it known that I, EUGENE J. TIMERMAN, a citizen of the United States, and a resident of Syracuse, in the county of Onondaga and State of New York, have invented a new and Improved Lubricator, of which the following is a full, clear, and exact description.

The present invention relates to new and useful improvements in lubricators, and pertains more particularly to lubricators for vehicle spring shackles.

It is the primary object of the present invention to provide means by which the lubricant may be effectively applied to the bearing surface of a spring shackle.

Referring to the drawings—

Figures 1, 2:
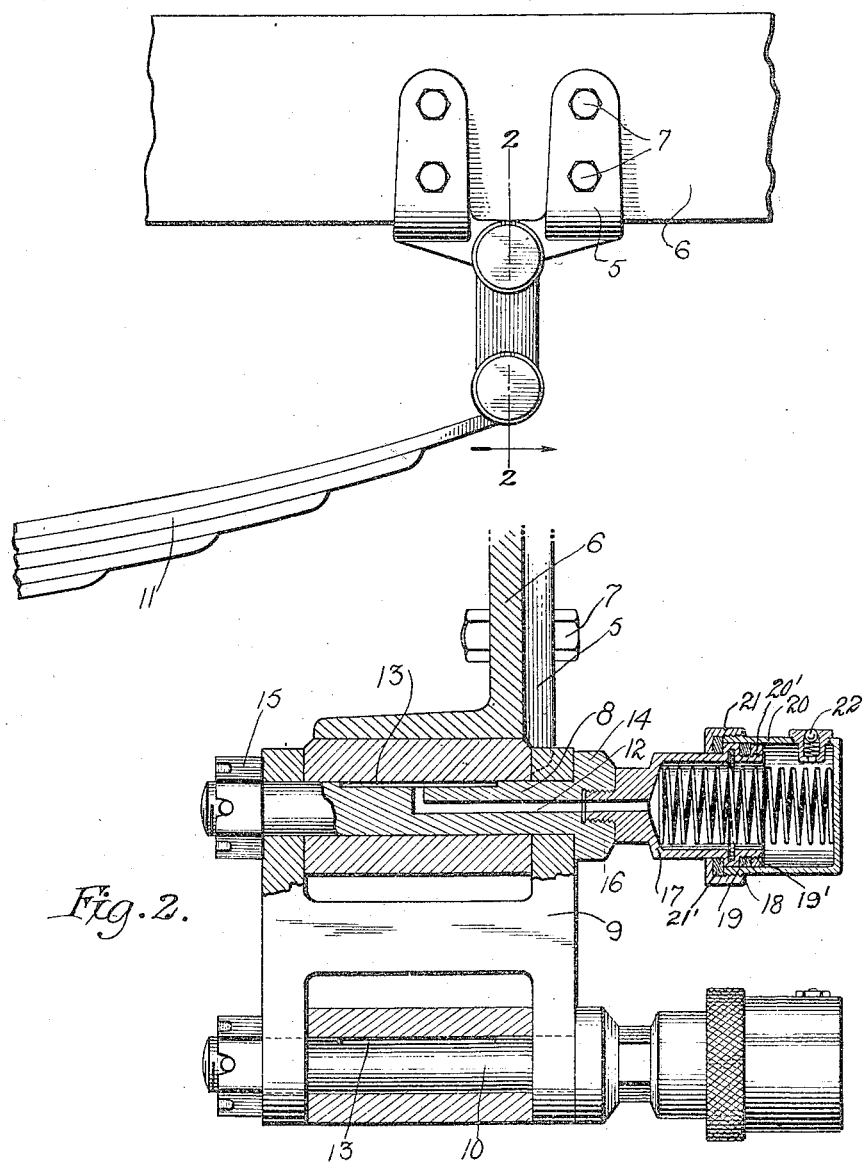
Figure 1 is a detail elevation.
Fig. 2 is a sectional view on the line 2—2 of Fig. 1.

Referring more specifically to the drawings, the reference character 5 designates a spring clip, which is secured to the vehicle frame 6 by means of bolts, rivets or the like 7.

Pivotally mounted by means of a pintle or the like 8, to the clip 5, is a shackle 9, and pivotally mounted in the lower ends of said shackle 9 is a pintle 10, to which the end of the spring 11 is secured. Each of the pintles 8 and 10 is provided with an axial lubricant passage 12, and each of said lubricant passages 12 terminates in a discharge passage 13 on the bearing surface of its respective pintle. One end of each of the pintles 8 and 10 is provided with an enlarged head 14, the other end being screw-threaded for the reception of a nut 15, which serves to prevent displacement of said pintle. The heads 14 of the pintles are recessed on their outer face as at 16, the inner walls of said recesses being provided with screw threads as shown. Threaded into each of the recesses 16, is a lubricant cup 17, and said cups have on their outer end a flange 18, in which is seated a suitable packing 19, which is secured in place by means of the ring 19′, which in turn has threaded engagement with the screw-threaded portion 20′ of the receptacle 17.

The reference character 20 designates a cover for said lubricant cups, and said cover in each case is provided with a screw-threaded flange 21, which is adapted to engage the outer wall of the lubricant receptacle 17 behind its flange 18 to secure a packing 21′. These covers are also provided with a spring-seated ball valve 22, by means of which the lubricant is introduced to the interior thereof.

Interposed between the bottom of the lubricant receptacle 17 and the cover 20, is a coil spring 23, said coil spring 23 serving to maintain the cover 20 in extended position relative to its respective lubricant receptacle.

The operation is as follows:

With the parts in the position shown in Fig. 8, liquid lubricant is introduced through the valve 22. When the lubricant receptacle and its cover have been filled with lubricant, the cover is moved relatively to the receptacle and the lubricant is forced by means of the passage 12 and the discharge 13 to the shackle bearing.

By this construction, it will be apparent that a thorough lubrication of the shackle is obtained, and that through the medium of the coil spring 23, the cover is returned to its normal position automatically after each operation, thus positioning the parts for the next operation.

What is claimed is:

A lubricating device comprising a receptacle having an externally screw-threaded open end, an annular flange formed integral with said receptacle adjacent said open end, a packing positioned between said flange and the open end of said receptacle, a nut engaging the externally threaded open end of the receptacle and adapted to compress said packing against said annular flange, a second receptacle adapted for sliding engagement with the flange of the first-mentioned receptacle, and means for maintaining said second mentioned receptacle extended with respect to the first-mentioned receptacle.

EUGENE JOSEPH TIMERMAN.